US007876934B2

(12) United States Patent
Georgescu et al.

(10) Patent No.: US 7,876,934 B2
(45) Date of Patent: Jan. 25, 2011

(54) METHOD OF DATABASE-GUIDED SEGMENTATION OF ANATOMICAL STRUCTURES HAVING COMPLEX APPEARANCES

(75) Inventors: Bogdan Georgescu, Princeton, NJ (US); Xiang Zhou, Exton, PA (US); Dorin Comaniciu, Princeton Jct., NJ (US); R. Bharat Rao, Berwyn, PA (US); Alok Gupta, Bryn Mawr, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 714 days.

(21) Appl. No.: 11/265,772

(22) Filed: Nov. 2, 2005

(65) Prior Publication Data
US 2006/0171586 A1    Aug. 3, 2006

Related U.S. Application Data

(60) Provisional application No. 60/625,908, filed on Nov. 8, 2004.

(51) Int. Cl.
*G06K 9/00*    (2006.01)

(52) U.S. Cl. .................. 382/128; 382/130; 382/131; 382/132; 382/159; 382/165; 382/171; 382/173; 382/181; 382/195; 382/199; 382/203; 382/209; 382/218; 382/220; 382/224; 128/922; 128/923

(58) Field of Classification Search .............. 382/128, 382/131, 132, 164, 165, 171, 173, 209, 218, 382/220, 224, 130, 181, 195, 199, 203, 225; 128/922, 923

See application file for complete search history.

(56) References Cited

U.S. PATENT DOCUMENTS

| | | | | |
|---|---|---|---|---|
| 5,757,953 A | * | 5/1998 | Jang | 382/132 |
| 5,878,746 A | * | 3/1999 | Lemelson et al. | 600/407 |
| 5,926,568 A | * | 7/1999 | Chaney et al. | 382/217 |
| 6,106,466 A | * | 8/2000 | Sheehan et al. | 600/443 |
| 6,456,741 B1 | * | 9/2002 | Lee et al. | 382/190 |
| 6,463,175 B1 | * | 10/2002 | Lee | 382/190 |
| 6,560,354 B1 | * | 5/2003 | Maurer et al. | 382/131 |
| 6,647,139 B1 | * | 11/2003 | Kunii et al. | 382/159 |
| 6,716,175 B2 | * | 4/2004 | Geiser et al. | 600/450 |

(Continued)

OTHER PUBLICATIONS

Bosch, J.G.; Mitchell, S.C.; Lelieveldt, B.P.F.; Nijland, F.; Kamp, O.; Sonka, M.; Reiber, J.H.C.; Automatic segmentation of echocardiographic sequences by active appearance motion models. Medical Imaging, IEEE Transactions on Nov. 2002, vol. 21, Issue 11, pp. 1374-1383.*

(Continued)

*Primary Examiner*—Vikkram Bali
*Assistant Examiner*—Julian D Brooks

(57) ABSTRACT

A method for segmenting an anatomical structure of interest within an image is disclosed. The anatomical structure of interest is compared to a database of images of like anatomical structures. Those database images of like anatomical structures that are similar to the anatomical structure of interest are identified. The identified database images are used to detect the anatomical structure of interest in the image. The identified database images are also used to determine the shape of the anatomical structure of interest. The anatomical structure of interest is segmented from the image.

18 Claims, 15 Drawing Sheets

U.S. PATENT DOCUMENTS

| | | | | |
|---|---|---|---|---|
| 7,295,706 | B2* | 11/2007 | Wentland et al. | 382/181 |
| 7,400,760 | B2* | 7/2008 | Takizawa et al. | 382/153 |
| 7,680,312 | B2* | 3/2010 | Jolly et al. | 382/128 |
| 7,747,054 | B2* | 6/2010 | Zhou et al. | 382/128 |
| 2001/0043729 | A1* | 11/2001 | Giger et al. | 382/128 |
| 2003/0076987 | A1* | 4/2003 | Wilson et al. | 382/128 |
| 2003/0228040 | A1* | 12/2003 | Oosawa | 382/128 |
| 2004/0013304 | A1* | 1/2004 | Viola et al. | 382/224 |
| 2004/0047498 | A1* | 3/2004 | Mulet-Parada et al. | 382/128 |
| 2004/0165767 | A1* | 8/2004 | Gokturk et al. | 382/159 |
| 2004/0213454 | A1* | 10/2004 | Lai et al. | 382/159 |
| 2004/0264755 | A1* | 12/2004 | Sakaida | 382/128 |
| 2005/0137806 | A1* | 6/2005 | Kutsyy et al. | 702/19 |
| 2006/0018521 | A1* | 1/2006 | Avidan | 382/118 |
| 2007/0127798 | A1* | 6/2007 | Chakraborty et al. | 382/128 |

OTHER PUBLICATIONS

Mitchell, S.C.; Lelieveldt, B.P.F.; van der Geest, R.J.; Bosch, H.G.; Reiver, J.H.C.; Sonka, M.; Multistage hybrid active appearance model matching: segmentation of left and right ventricles in cardiac MR images. Medical Imaging, IEEE Transactions on May 2001, vol. 20, Issue 5, pp. 415-423.*

Viola, P.; Jones, M.; Rapid object detection using a boosted cascade of simple features. Computer Vision and Pattern Recognition, 2001. CVPR 2001. Proceedings of the 2001 IEEE Computer Society Conference in 2001. pp. I-511-I-518.*

Lynch, M.; Ghita, O.; Whelan, P.F.; Extraction of epi-cardium contours from unseen images using a shape database. Nuclear Science Symposium Conference Record, 2004 IEEE, Oct. 16-22, 2004, vol. 6 pp. 3685-3688.*

Goodall, "Procrustes Methods in the Statistical Analysis of Shape," Journal of the Royal Statistical Society, vol. 53, No. 21, (1991), pp. 285-339.*

Elkan, "Boosting and Naïve Bayesian Learning", Dept of Computer Science and Engineering University of California, Technical Report No. CS97-557, Sep. 1997, pp. 1-11.*

Georgescu Bogdan, et al. "Real-Time Multi-model Tracking of Myocardium in Echocardiography Using Robust Information Fusion," (2004) pp. 777-785 XP-002368131.

* cited by examiner

METHOD OF DATABASE-GUIDED SEGMENTATION OF ANATOMICAL STRUCTURES HAVING COMPLEX APPEARANCES

CROSS-REFERENCE TO RELATED APPLICATION

This application claims the benefit of U.S. Provisional Patent Application Ser. No. 60/625,908, filed on Nov. 8, 2004, which is incorporated by reference in its entirety.

FIELD OF THE INVENTION

The present invention is directed to a method for detecting structure and shape inference of an anatomical structure using database-guided segmentation, and more particularly, to a method for detecting structure and shape inference of an anatomical structure by first discriminating the structure from the background and using discriminative features to infer the shape of the structure.

BACKGROUND OF THE INVENTION

Segmentation of anatomical structures has been traditionally formulated as a perceptual grouping task and solved through clustering and variational approaches. However, such strategies require a priori knowledge to be explicitly defined in the optimization criterion (e.g., "high-gradient border", "smoothness" or "similar intensity or texture"). These approaches are limited by the validity of the underlying assumptions and cannot capture complex structure appearance.

Accurate localization of complex structures is important in many computer vision applications ranging from facial feature detection to segmentation of anatomical structures in medical images or volumes. Availability of large databases with expert annotation of the interest structures makes a learning approach more attractive than classical approaches of solving perceptual grouping tasks through clustering or variational formulations. This is especially important when the underlying image structure does not have clear border definition, show complex appearance with large amounts of noise, or when there is a relatively large variation between expert's own annotations.

The difficulty of the segmentation task is illustrated in FIG. 1. FIG. 1 shows ultrasound images of the heart in which the left ventricle border or endocardium is to be delineated. Automated segmentation of echocardiographic images has proved to be challenging due to large amounts of noise, signal dropout and large variations between appearance, configuration and shape of the left ventricle. Also as can be seen from these images, the shape and appearance varies from image to image.

Segmentation is one of the most important low level image processing methods and has been traditionally approached as a grouping task based on some homogeneity assumption. For example, clustering methods have been used to group regions based on color similarity or graph partitioning methods have been used to infer global regions with coherent brightness, color and texture. Alternatively, the segmentation problem can be cast in an optimization framework as the minimization of some energy function. Concepts such as "high-gradient border", "smoothness" or "similar intensity or texture" are encoded as region or boundary functionality in the energy function and minimized through variational approaches.

However, as the complexity of targeted segmentation increases, it is more difficult to encode prior knowledge into the grouping task. Learning has become more important for segmentation and there are methods that infer rules for the grouping process that are conditioned by the user input.

In a different known approach, active appearance models use registration to infer the shape associated with the current image. However, modeling assumes a Gaussian distribution of the joint shape-texture space and requires initialization close to the final solution. Alternatively, characteristic points can be detected in the input image by learning a classifier through boosting. There is a need for a method which directly exploits expert annotation of the interest structure in large databases by formulating the segmentation as a learning problem.

SUMMARY OF THE INVENTION

The present invention is directed to a method for segmenting an anatomical structure of interest within an image or volume. The anatomical structure of interest is compared to a database of images of like anatomical structures. The images in the database can carry associated patient information such as demographic, clinical, genetic/genomic/proteomic information. Those database images of like anatomical structures that are similar to the anatomical structure of interest are identified. Similarity measure is defined in terms of either image features such as intensity pattern or its statistics, or other associated information such as demographic, clinical, genetic/genomic/proteomic information, or both. The identified database images or trained classifiers are used to detect the anatomical structure of interest in the image. The identified database images are also used to determine the shape of the anatomical structure of interest. The anatomical structure of interest is segmented from the image.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for detecting and matching anatomical structures. An example where such a method would be utilized is for to detecting regional wall motion abnormalities in the heart by detection and segmentation of the ventricle endocardial or epicardial borders through machine learning, or classification, and by identifying similar cases from annotated databases. It is to be understood by those skilled in the art that the present invention may be used in other applications where shape detection and matching is useful such as, but not limited to, recognizing human features such as facial features or other body features. The present invention can also be used in 2 dimensional, 3 dimensional and 4 dimensional (3D+time) data analysis, such as medical analysis of anatomical structures such as the heart, lungs or tumors, which can be evolving over time.

Figure 2:
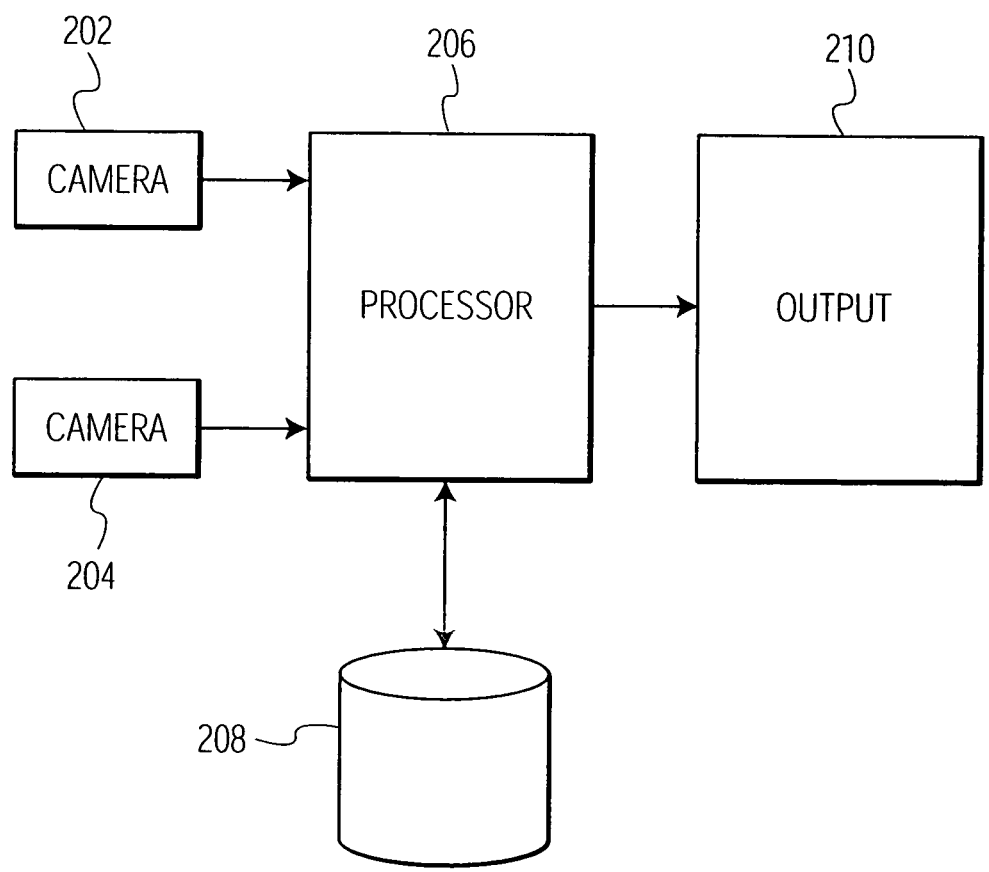
FIG. 2 illustrates an exemplary architecture of an echocardiograph system that uses a method for detecting and tracking the shape of an endocardial wall of a left ventricle in accordance with the present invention.

For purposes of describing the present invention, an example will be described for database-guided detection of the endocardial wall of the left ventricle of a human heart. The present invention can also be used for database-guided shape inference of the endocardium. FIG. 2 illustrates an exemplary architecture of an echocardiograph system that uses a method for detecting an endocardial wall of a left ventricle using shape and appearance in accordance with the present invention. A medical sensor 202, such as an ultrasound transducer is used to perform an examination on a patient. The sensor 202 is used to obtain medical measurements consistent with a particular medical examination. For example, a patient experiencing heart problems may have an echocardiogram performed to help diagnose the particular heart ailment. An ultrasound system provides two-, three-, and four (3D+time)-dimensional images of the heart from various perspectives.

The information obtained by the sensor 202 is communicated to a processor 204 which may be a workstation or personal computer. The processor 204 converts the sensor data into an image that is communicated to display 208. The display 208 may also communicate other graphical information or tables of information relating to the image. In accordance with the present invention, the processor 204 is also provided with data representing an initial contour of the endocardial wall. The data may be provided manually by a user such as a physician or sonographer, or automatically by the processor 204. The contour comprises a series of individual points, the movement of which is tracked by the processor 204 and illustrated on display 208.

In addition to data from the medical sensor 202, the processor 204 may also receive other data inputs. For example, the processor may receive data from a database 206 associated with the processor 204. Such data may include subspace models that represent potential contour shapes for the endocardial wall. These subspace models may be images of left ventricles that are representative of a plurality of patients or may be computer generated models of contour shapes based on statistical information. The processor 204 tracks the individual points of the contour shape using known approaches such as Bayesian kernel matching or optical flow-based methods. Error accumulation during tracking is remedied by using a multi-template adaptive matching framework. Uncertainty of tracking is represented at each point in the form of a covariance matrix, which is subsequently fully exploited by a subspace shape constraint using a non-orthogonal projection.

Figure 13:
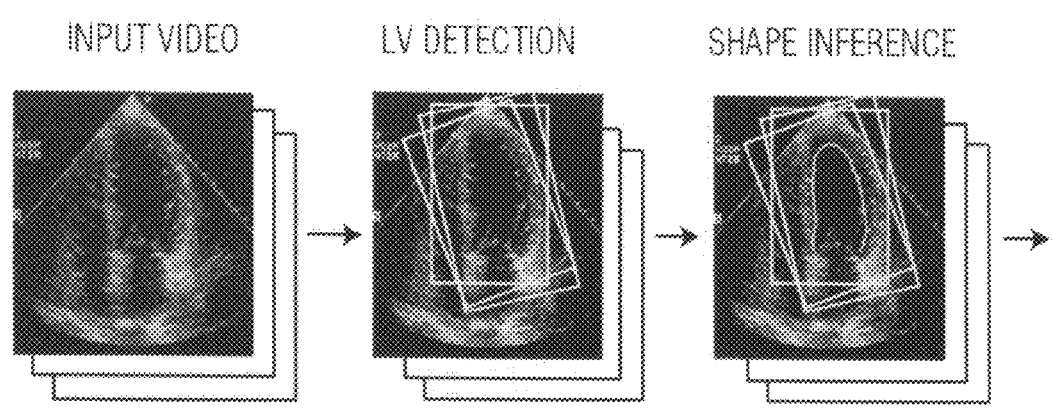
FIG. 13 illustrates the workflow for database-guided detection and shape inference of a left ventricle in accordance with the present invention.

The present invention uses database-guided segmentation to implicitly encode the prior knowledge embedded in expert annotated databases. The present invention is divided into two tasks. The first task is structure detection which discriminates between the appearance of the interest object and the background. The second task is shape inference which discriminates between appearances corresponding to different shapes and derives the most likely shape given an object appearance. FIG. 13 illustrates the general workflow for performing database-guided detection and shape inference of a left ventricle in accordance with the present invention. The present invention exploits multiple-expert, consensus annotation of the left ventricle endocardium using large databases.

Both tasks use the same pool of a large set of simple features for appearance representation. For structure detection, the features to solve a two class problem are selected using a boosted cascade of weak classifiers. As a result, the global rigid transformation for the possible locations of the interest object is found. For shape inference, a feature selection procedure is implemented to encode the joint distribution of appearance and shape. The local non-rigid shape deformation and the final segmentation are derived through a nearest neighbor approach by using a sample based representation of the joint distribution.

Some of the most successful real-time object detection methods are based on boosted cascade of simple features. By combining the response of a selected number of simple classifiers through boosting, the resulting strong classifier is able to achieve high detection rates and is capable of processing images in real time. The advantage of boosting as opposed to traditional Gaussian appearance models is that it can deal with complex distributions such as multi-modal distributions. Boosting is also much faster than other non-linear alternative such as kernel support vector machines.

Figure 14:
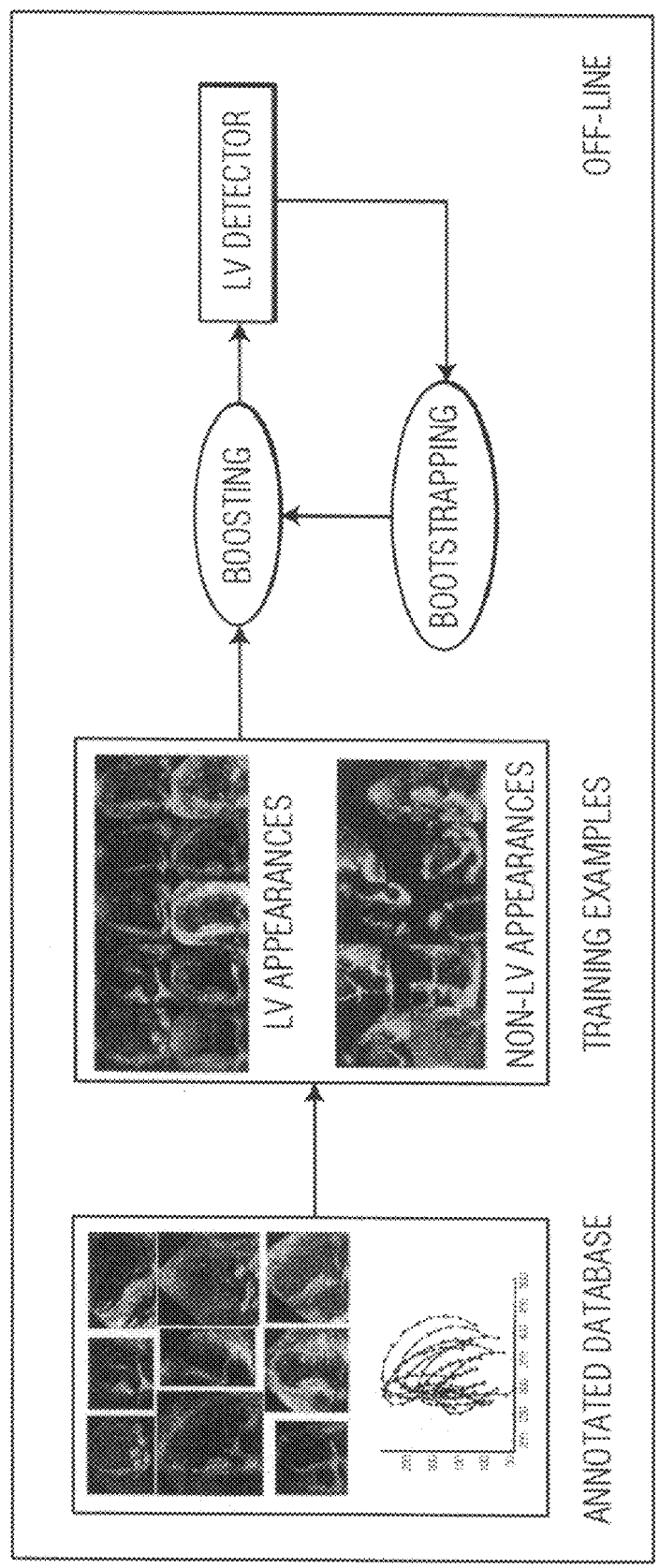
FIG. 14 illustrates a method for database guided structure detection using offline samples in accordance with the present invention.
Figure 15:
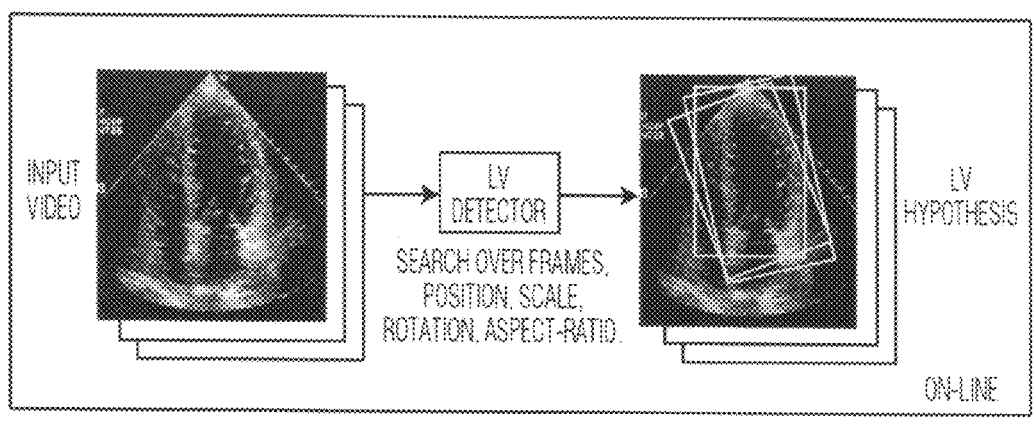
FIG. 15 illustrates a method for database guided structure detection using online samples in accordance with the present invention.

The database guided detection of a structure, such as a left ventricle, has two stages: an Off-line stage where the database of expert annotated structures is used to train a structure detector and an On-line stage where the detector is applied to the input image to find possible locations of the structure. In the off-line stage examples of the structure of interest and examples of the background are used to train a discriminative classifier through boosting. Iteratively, bootstrapping is used to retrain the current detector using the misclassified samples. In the on-line stage, the learned structure detector is used in the input images to search over frames, position, scale, rotation, aspect-ratio and other parameters used to align shapes in the off-line stage. FIGS. 14 and 15 are flow diagrams that illustrate the database guided learning and detection method in accordance with the present invention performed offline and online respectively.

The present invention uses rectangle features that are similar to Haar basis function and Adaboost to learn a two-class classifier able to distinguish between a set of positive appearance examples containing the object and a set of negative examples. Two of the problems that directly affect the stability of object appearance representation are unstable landmark points and invalid image regions. In accordance with the present invention, a weighted structure alignment is used to increase the influence of stable landmark points. A solution is also used to eliminate the influence of invalid image regions in feature computation.

As a data preprocessing step, the location parameters associated with the detection have to be eliminated from the object appearance training set. To generate the set of positive examples, the variations due to global rigid transformations are first eliminated through Procrustes alignment. Hence, the object appearance is normalized with respect to translation, rotation and scale. An important issue with respect to Procrustes shape alignment is the varying stability or detectability of the landmark points. In accordance with the present invention, points that are more stable or more detectable receive a higher weight during the least square alignment process. The present invention uses a weighted Procrustes alignment process, with the weights reflecting feature stability.

The stability of control points are quantified based on detectability using local detectors that learn from the neighboring appearance of each control point. In the context of left ventricle detection in echocardiography, local detectors perform much better near the basal region of the heart than those near the apical or lateral wall regions. This is consistent with the nature of ultrasound images: in apical views the reflection from the basal region is much stronger and more stable than the reflection from the apical or lateral wall, where signal dropout is most likely to happen.

With a weight matrix W, the minimized criterion for aligning shapes is given by the Mahalonobis distance:

$$\Im_{GPA} = \|s_i R_i c_i + t_i - \bar{c}\|_W \quad (1)$$

where $c_i$ represents the $i^{th}$ shape control point and $s_i$, $R_i$, $t_i$ represents scale, rotation and translation: $\bar{c}$ is the mean shape. This is solved iteratively through weighted least squares.

Figure 1:
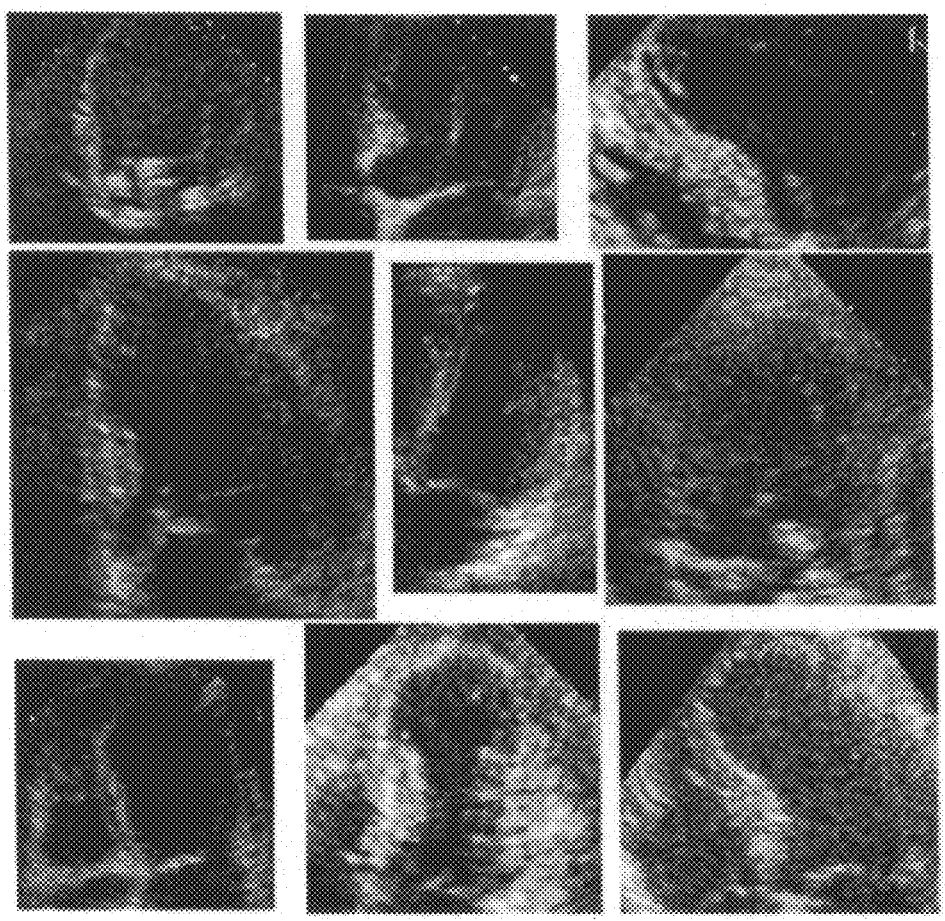
FIG. 1 illustrates ultrasound heart images that depict large variations in shape and appearance of the left ventricle.
Figure 3:
FIG. 3 illustrates examples of positive appearances of shape normalized images of left ventricle used for training in accordance with the present invention.

FIG. 3 illustrates some of the aligned positive appearance examples used for training. By comparing FIG. 3 with FIG. 1, it can be seen that in FIG. 3 the global rigid shape transformations are canceled out and the object appearance has some order as all instances share the same mean shape. The negative set is generated randomly from the same images by varying the parameters of the global transformations.

Simple features are used for the weak classifiers such as rectangle features which are similar to Haar functions and have been proven to provide a rich image representation for object detection. A problem in object detection is the presence of invalid image regions such as occlusions. The erroneous response of a weak classifier will negatively influence the detection outcome. The present invention includes a method to eliminate the influence of known invalid regions in the object detection process. For example, an echocardiograph image can be processed in a way that the image data outside of the fan (i.e., the non-useful or invalid data) is not considered. In other words, the data external to the fan is treated as an occlusion. The present invention provides minimal added computation and correctly estimates the weak classifier's response using only the valid image information.

Figure 4A:
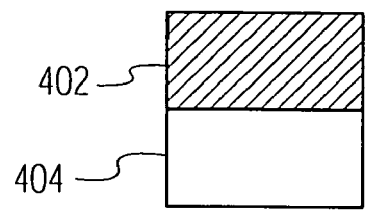
FIGS. 4a-4d illustrate examples of rectangle features representative of weak classifiers in accordance with the present invention.
Figure 4B:
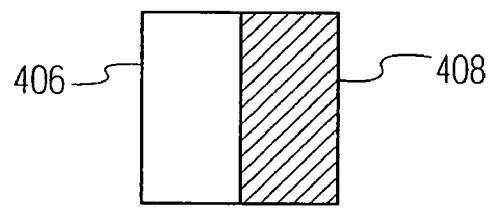
Figure 4C:
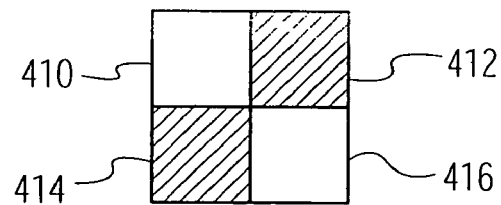
Figure 4D:
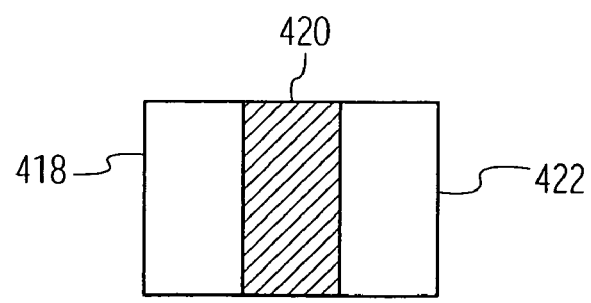

Simple features associated with the image of the object are identified as weak classifiers. Examples of such features are the rectangular features illustrated in FIGS. 4a-4d. The value of each rectangular feature is the difference between the sums of pixel intensities in the white (also referred to as positive) regions and gray (also referred to as negative) regions of each rectangle. For the rectangular feature illustrated in FIG. 4a, the negative region is 402 and the positive region is 404. For the rectangular feature illustrated in FIG. 4b, the negative region is 408 and the positive region is 406. For the rectangular feature illustrated in FIG. 4c, the negative regions are 412 and 414 and the positive regions are 410 and 416. For the rectangular feature illustrated in FIG. 4d, the negative region is 420 and the positive regions are 418 and 422.

Figure 5:
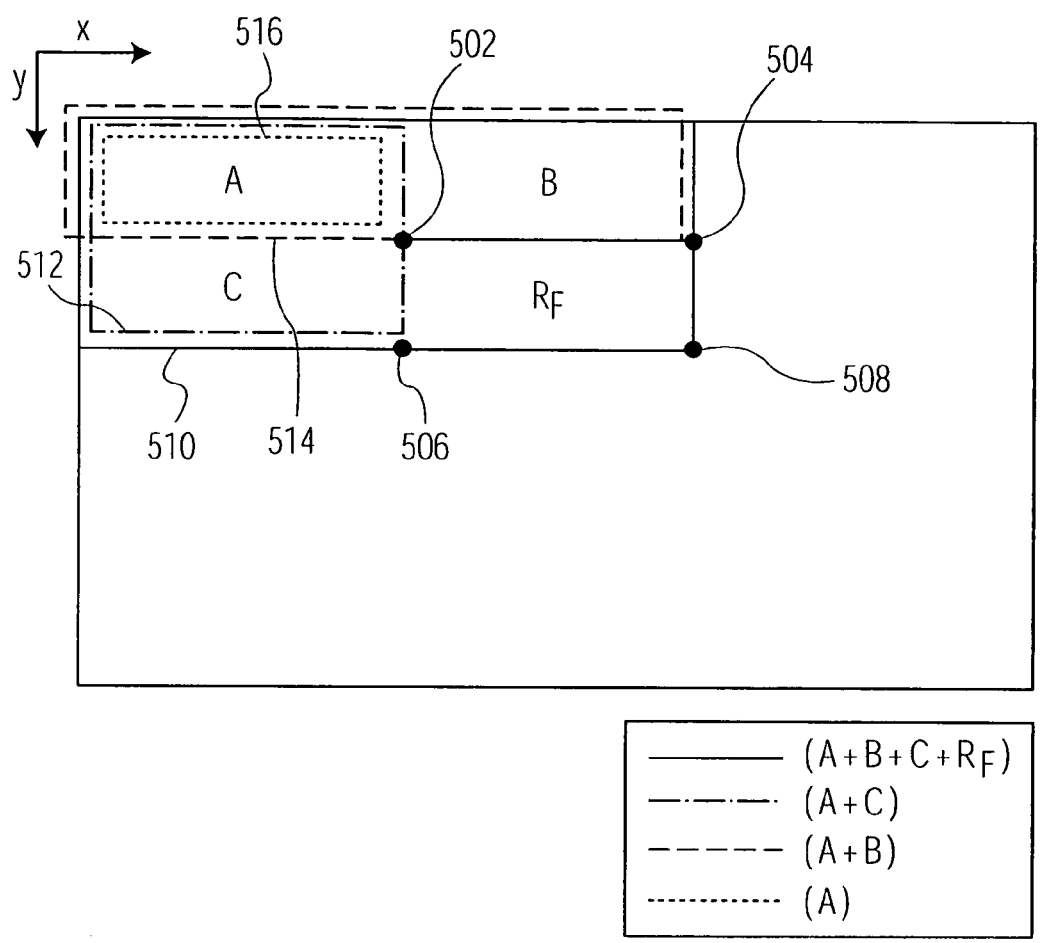
FIG. 5 illustrate a method for using an integral image to determine a sum of intensities for a given window in accordance with the present invention.

Rectangle features provide an over complete basis for a base region. For example, if the rectangle is 24.×24 pixels in size, the number of features is 180,000. One of the advantages of rectangle features is computational speed. By using an intermediate representation known as an Integral Image (II) as shown in FIG. 5, a feature value can be calculated with a small fixed number of operations.

The II for an input image (e.g., an echocardiograph image of a left ventricle) is pre-calculated prior to the calculation of rectangular features. For each pixel (x,y) in II, an intensity value is determined. These intensity values are stored in database 208 (FIG. 2). Once the II has been computed for the input image, all future calculations are greatly simplified. For each pixel at a location $(x_o, y_o)$ in the input image, an intensity value can be computed by determining the sum of intensities of all pixels that are above and to the left of location $(x_o, y_o)$. In other words, a subset of the II can be determined at II $(x_o, y_o)$ as follows:

$$II(x_o, y_o) = \sum_{x \le x_o, y \le y_o} I(x, y), \quad (2)$$

where I(x,y) is the intensity of the pixel at location (x,y).

FIG. 5 illustrates how the computation of the intensity value for the II at rectangle feature $R_f$ is determined. An II at location 508 is computed which is equal to the area inside solid line 510. Another way to define the II at location 508 is the sum of intensity values for rectangles $(A+B+C+R_f)$. In order to obtain the sum for $R_f$, additional computations must be made. The II for location 506 provides the sum for the area defined by line 512 which is equal to the sum of intensity values for rectangles (A+C). Subtracting the II for location 506 from the II for location 508 results in the II' for the rectangles $(B+R_f)$. Next, the II for location 504 is computed which provides the sum for the area defined by (A+B). Subtracting the II for location 504 from II' results in the II" for the rectangles $(-A+R_f)$. Finally, the II for location 502 is added to II" which provide the sum for $R_f$.

Figure 6A:
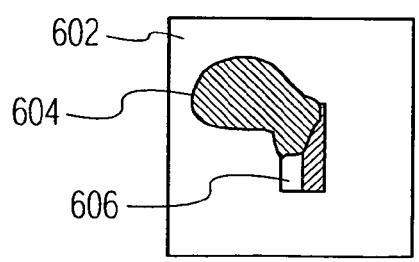
FIGS. 6a and 6b illustrate a rectangular feature in an integral image that is partially occluded in accordance with the present invention.

However, in the instance where pixels in $R_f$ include occlusions, the intensity values for those pixels provide invalid values which will ultimately yield an incorrect estimate for the rectangular feature. FIG. 6a illustrates an example of an integral image 602 that includes an occlusion 604. A rectangular feature 606 is placed at a location that includes part of the occlusion 604.

Figure 6B:
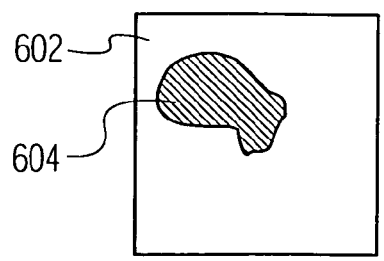

In accordance with the present invention, an occlusion mask is used to eliminate the contribution of the pixels contained in the rectangular feature that are occluded. An example of an occlusion mask for the II of FIG. 6a is shown in FIG. 6b. It is clear that an invalid intensity value for a pixel will yield an incorrect estimate for that feature using that pixel (FIG. 6a). If the valid image mask is available, it can be used to eliminate the contribution of the invalid pixels to the feature value.

The occlusion mask can be used when images are taken in controlled environments or it can be inferred from the data. For example, in surveillance applications, the static background is known (e.g., the location of doors, walls, furniture, etc.). The likelihood of objects in the background causing occlusions can be determined and used to create the occlusion mask. Another example is an ultrasound image. In an ultrasound image the fan location is either given by the ultrasound machine, or can be computed, e.g., analysis of time variations can yield static invalid regions. Once the fan is identified, an occlusion mask can be created to effectively exclude or nullify the presence of the fan in II computations.

By setting the intensity value for occluded or otherwise invalid pixels to zero, the sum of intensity values for the rectangle will no longer be influenced by incorrect values. However, because there is now "missing" data, the sum will be unbalanced. When there are no missing values, the rectangle sum is proportional to the mean intensity value for the rectangle. Therefore, to compensate for the missing values, the mean value is approximated by using the number of pixels having valid intensity values when the occlusion is present. The number of valid pixels can be found by first computing an equivalent map or occlusion mask.

The occlusion mask M is comprised of Boolean values where valid pixels are assigned a value of 1 and invalid or occluded pixels are assigned a value of 0. An integral mask can be computed using the number of valid pixels above and to the left of the current location $(x_o, y_o)$ as follows:

$$IIM(x_o, y_o) = \sum_{x \leq x_o, y \leq y_o} M(x, y). \tag{3}$$

Similar to the II of equation (2), the number of valid pixels in a rectangle can be computed from the integral mask in the same number of operations as described above.

The equivalent feature value for the rectangular feature 606 will be given a weighted difference between the sum of intensities in the positive and negative image regions. If $R_+$ denotes the region where the pixel intensities contribute with a positive value and $R_-$ denotes the region where the pixel intensities contribute with a negative value, the feature value f is as follows:

$$f = \frac{n_-}{N} \sum_{(x,y) \in R_+} I(x, y) - \frac{n_+}{N} \sum_{(x,y) \in R_-} I(x, y), \tag{4}$$

where $n_-$, $n_+$ denote the number of valid pixels for negative and positive regions respectively, each containing N pixels. If both $n_-$ and $n_+$ are non-zero, the final feature value is normalized by $N/(n_- n_+)$. By using the occlusion mask to calculate the integral image for the rectangular feature, more accurate results are obtained which result in better object detection. It can be easily checked that when all pixels are valid, the feature value is equal to the original and the value goes to zero if one of the regions becomes more occluded.

Because of the large number of features or components that need to be calculated for the detection of objects, particularly in the case of complicated objects such as faces or anatomical structures, tools are used to reduce the amount computation required while still yielding accurate results. One such tool which is commonly used is boosting. In general, boosting identifies a plurality of weak classifiers or features. For each weak classifier a value can be computed which is then compared to a predefined threshold. If the value for the weak classifier is above the threshold, the classifier is retained. If the value for the weak classifier is below the threshold, the classifier is rejected. By weighted-summing all the values for the weak classifiers that exceeded the threshold, a strong classifier can result which can be used in object detection.

The result of the first classification task is a set of possible locations of the structure of interest and the likelihood of a particular appearance instance is measured by the detection score. The associated shape is the mean shape used in alignment, deformed by the corresponding rigid global transformation. In accordance with the present invention, given an appearance of interest structure, the most likely associated shape is determined. For this task, the expert's structure annotations are directly used by maintaining a sample based representation of the joint distribution of appearance and shape.

Figure 16:
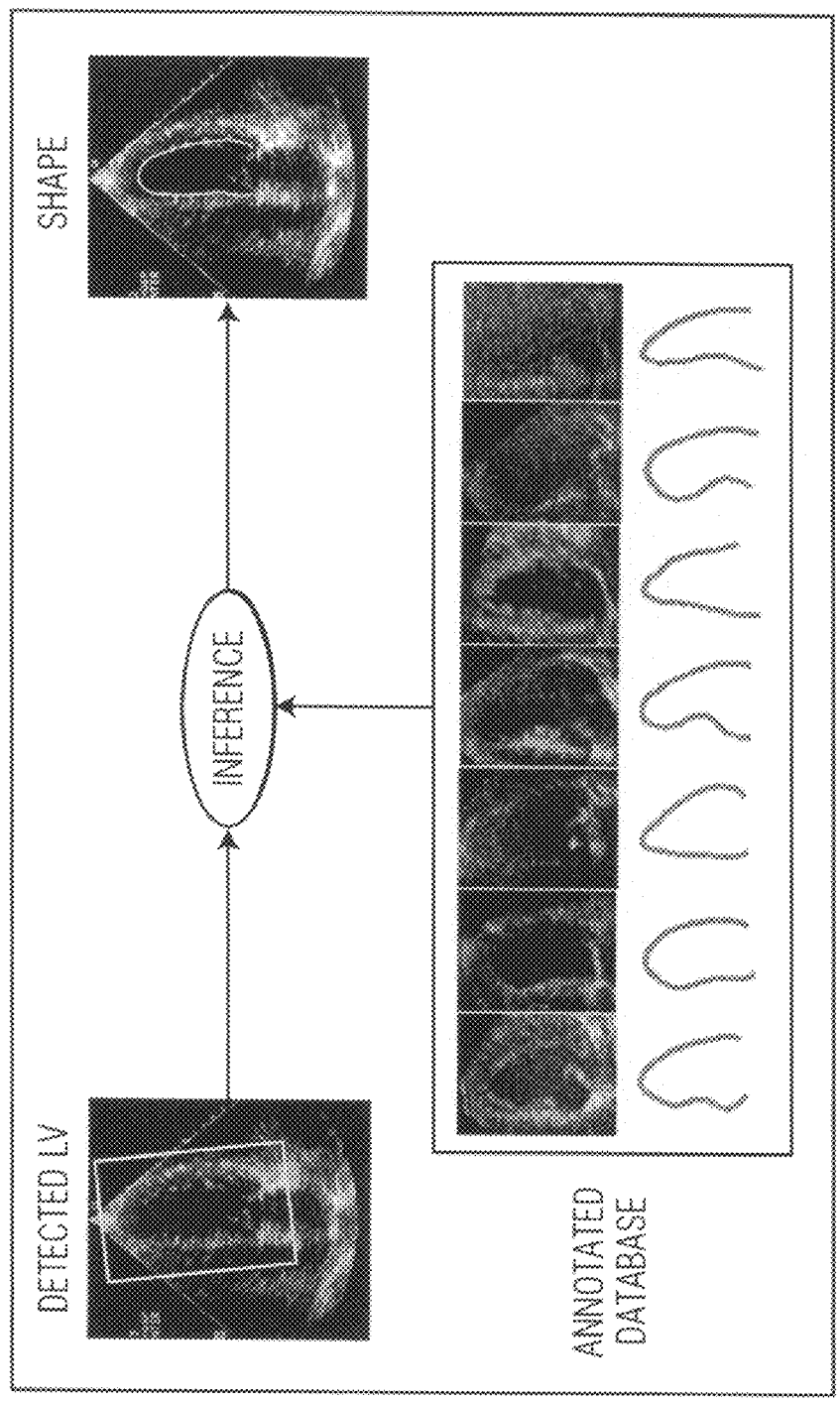
FIG. 16 illustrates a method for database guided shape inference of a structure in accordance with the present invention.

To infer the shape, the nearest neighbor approach is used by finding the closest prototypes in the database 208 (FIG. 2). FIG. 16 illustrates a method for database-guided shape inference in accordance with the present invention. To measure similarity, the distance between the image intensities is used directly or the features selected for the detection classifier are used and the shape is inferred through the nearest neighbor method. The most relevant appearance features are selected based on the distance between shapes. The similarity distance is equivalent to the probability of observing that appearance instance given the training set, and therefore is combined with the detection score to yield the most likely segmentation.

Figure 7:
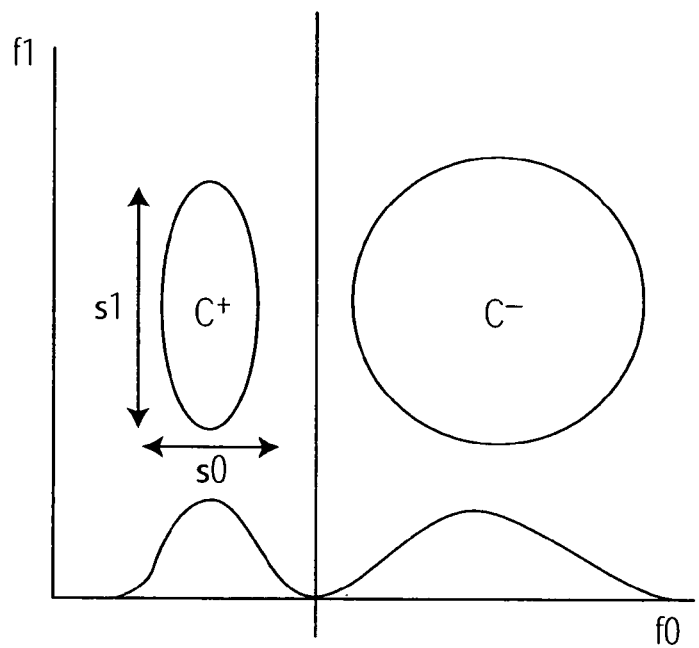
FIG. 7 illustrates a graph that shows how feature are selected for classification rather than within class variance in accordance with the present invention.

However, because the detection classifier was trained to distinguish between the positive and the negative examples, the selected features for detection are best to maximize the class separability and do not necessarily express the "within class" variability. This is illustrated in FIG. 7, where $f_1$ represents better the variability of the positive class than $f_0$ which is better for detection. The present invention uses a simple feature selection method from the same feature pool used in the detection stage to better capture the within class variability. The method can be seen as a boosting approach for improving nearest neighbor classification.

The problem is to select the features that best associate the respective appearance with the corresponding shape. Note that the number of initial features can be quite large (~200,000) and also the number of samples is large (~5000), therefore the selection procedure has to be simple and the evaluation criterion fast to compute.

At run time, the features are provided and the associated shape is inferred from the joint distribution (f,c) where f denotes the appearance feature vector and c the corresponding shape. The feature selection criterion in this case is the one that minimizes the distance between the inferred shape and the real shape. In other words, the distance between shapes is $$d(c_q, c_r) = (c_q - c_r)^T (c_q - c_r) \tag{5}$$

is emulated through the distance between the feature vectors:

$$d(f_q, f_r) = (f_q - f_r)^T \Sigma (f_q - f_r) \tag{6}$$

where $(f_q, c_q)$, $(f_r, c_r)$ represent the vector of the query and respectively the reference, and $\Sigma$ is the linear metric associated with the feature vector space.

Figure 8:
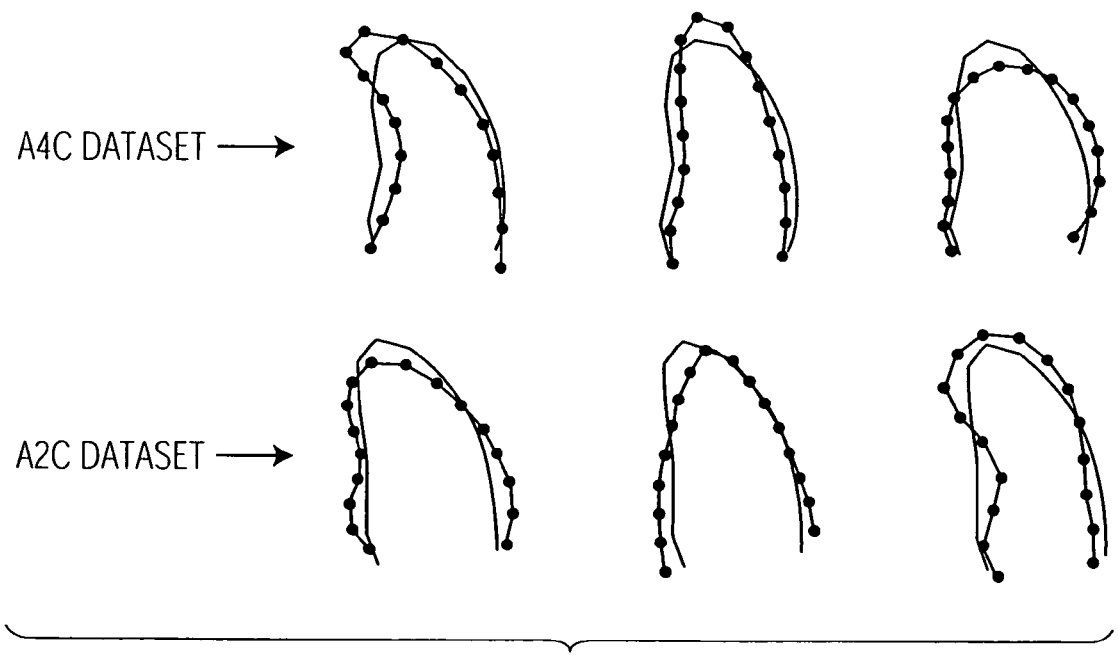
FIG. 8 illustrates some of the shape modes obtained through clustering relative to the mean shape in accordance with the present invention.

A simple selection procedure is used based on forward sequential feature selection with the criteria based on class separability. The feature space is emulated as closely as possible to the distance in the shape space. Thus, the data is clustered in the shape space in a representative number of shape clusters K. Because the criterion to be minimized is the Euclidean distance between shapes, a simple K-means algorithm can be used for clustering which assumes an isotropic Gaussian distribution in the shape space. This partitions the original feature vectors in K classes. The number of clusters is not critical because it is only used to impose the shape space metric to the feature space. FIG. 8 illustrates some of the shape modes obtained through clustering relative to the mean shape for two exemplary datasets (A4C and A2C).

Next the best subset of the original feature set that best separates the detected classes must be found. To measure class separability, a well known criteria approach based on the between class and within class variance is used:

$$\Im_{sel} = \text{trace}(S_w^{-1} S_b) \quad (7)$$

where $S_w$ is the within class variance and $S_b$ is the between class variance.

In some instances, the points belonging to one cluster might not be grouped in the feature space, but the class is still separable from the others (multiple modes). Because of the large number of features and a potential large number of training samples, nonparametric computation is not feasible. Under a normal distribution assumption, the matrices are computed as follows:

$$S_b = \sum_{k=1}^{K} \pi_k (\bar{f}_k - \bar{f})(\bar{f}_k - \bar{f})^\top \quad (8)$$

and $$S_\omega = \sum_{k=1}^{K} \pi_k \Sigma_k \quad (9)$$

where $\pi_k$, $f_k$, $\Sigma_k$ are the probability, mean and covariance of class k and f the global mean feature.

The standard forward sequential feature selection approach is used to determine the relevant features. The method starts with an empty set. At each step, each feature is tested and the one yielding the largest increase in the criterion function (7) is added to the current set. The selection is stopped when no significant change in the criterion occurs.

The shape of the discriminating metric matrix $\Sigma$ is determined by the within and between-class covariance matrices:

$$\Sigma = S_\omega^{-1/2}(S_\omega^{-1/2} S_b S_\omega^{-1/2} + \epsilon I) S_\omega^{-1/2} \quad (10)$$
$$= S_\omega^{-1/2}(S_b^* + \epsilon I) S_\omega^{-1/2}$$

which spheres the space with respect to $S_w$ and then it stretches the space in the null space of $S_b^*$. The parameter $\epsilon$ rounds the neighborhood.

Segmentation starts with an input image sequence on which the appearance candidates (detection) are determined through a hierarchical search in the discretized rigid transformation parameter space (e.g., translation, scale, rotation and image frame). The search is refined for parameters corresponding to positive responses with a large error margin of the detection classifier. Multiple hypotheses are maintained for the appearance candidates for which the shape is inferred. The shape $\hat{c}$ is computed through a kernel smoother given by the Nadaraya-Watson kernel-weighted average $$\hat{c}(f) = \frac{\sum_{i=1}^{N} K_k(f, f_i) c_i}{\sum_{i=1}^{N} K_k(f, f_i)} \quad (11)$$

where $(f_i, c_i)$ is the $i^{th}$ sample of the N prototypes and f the query feature vector. For the kernel $K_k$ the Epanechnikov quadratic kernel is used $$K_k(f, f_i) = \begin{cases} 3/4 \left[1 - \frac{d(f, f_i)}{d(f, f_{[k]})}\right] & \text{if } \frac{d(f, f_i)}{d(f, f_{[k]})} \leq 1 \\ 0 & \text{otherwise} \end{cases} \quad (12)$$

where distance is given by (6) and $f_{[k]}$ is the $k^{th}$ prototype closest to the query.

The effect of using a kernel smoother is that it decreases the estimate variance, which is high for nearest-neighbor approach, at the expense of a higher bias. The final selected candidate is the one with a minimum detection score and small neighbor distance.

The performance of the method of the present invention was tested on two annotated sets of ultrasound heart image sequences. The A4C set contains apical 4 chamber views of the heart and comprised 206 videos and the A2C set has apical 2 chamber views of the heart and comprises 136 videos. The database has 5007 samples for the A4C set and 3330 samples for the A2C set. Associated shapes are characterized by a number of 17 control points.

Figure 9:
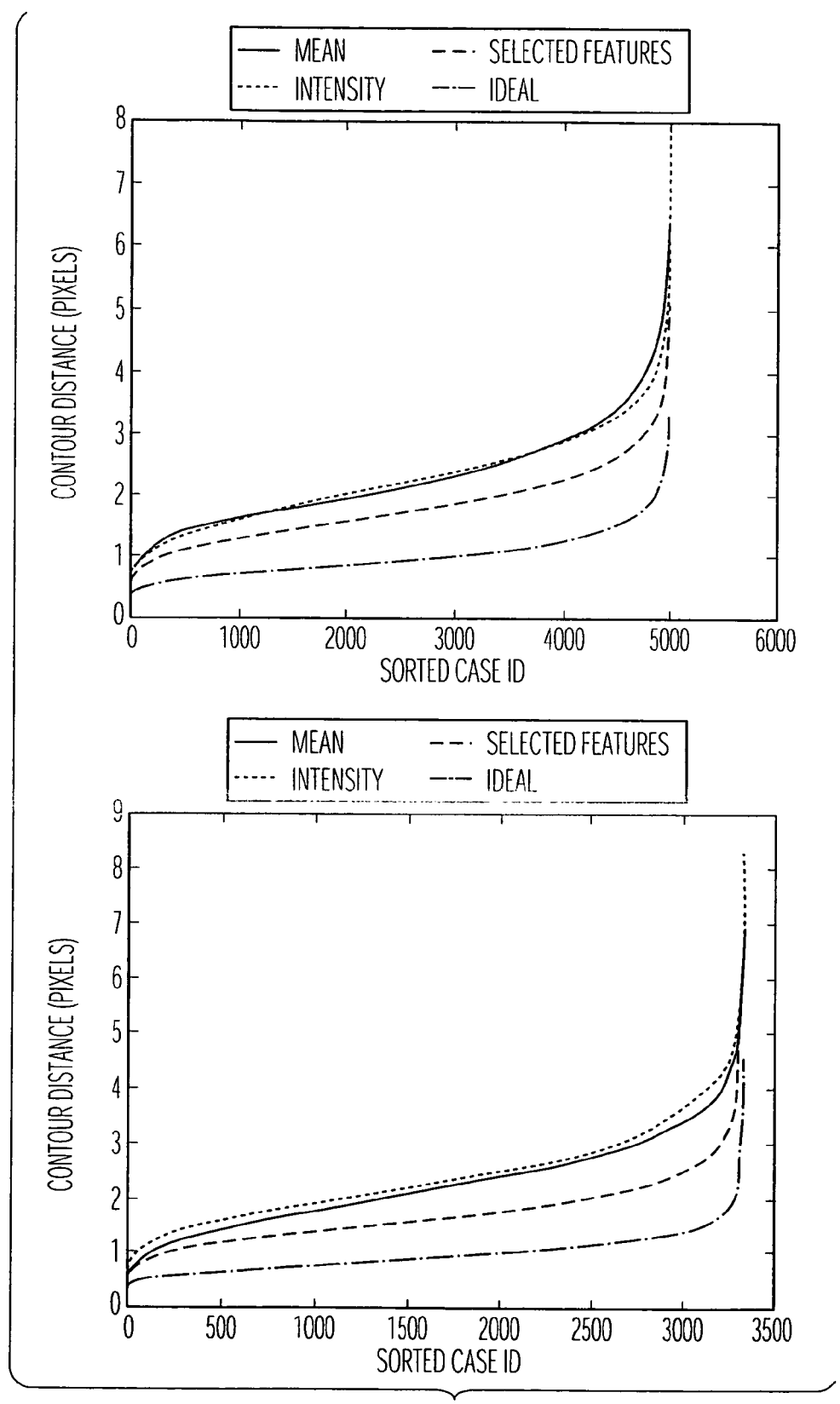
FIG. 9 are graphs illustrating the point error between the predicted shape and real shape by using mean shape, image intensity and selected features relative to the minimum error.

A first experiment shows the effectiveness of the selected features relative to using directly the image appearance, or using the features selected by boosting for detection. For this experiment, only the joint appearance-shape-distribution is considered, that is, the images are rigidly aligned. In FIG. 9, the distance is plotted between the inferred shape and the true shape by a leave-one-out method. Note that all the images that belong to the same video are excluded from the set and that no two videos are from the same patient. To visualize the errors, they are sorted for each curve, thus vertically they do not correspond to the same image. The top two curves in each graph represent the error between the true contour and the mean shape and the true contour and the true contour and the one inferred using the normalized appearance. Thus, using the appearance is the same on average than using the mean. This is true also by using detection features. The middle curve is the error by using the selected features and for reference the bottom curve is the nearest neighbor available in the shape space.

Figure 10A:
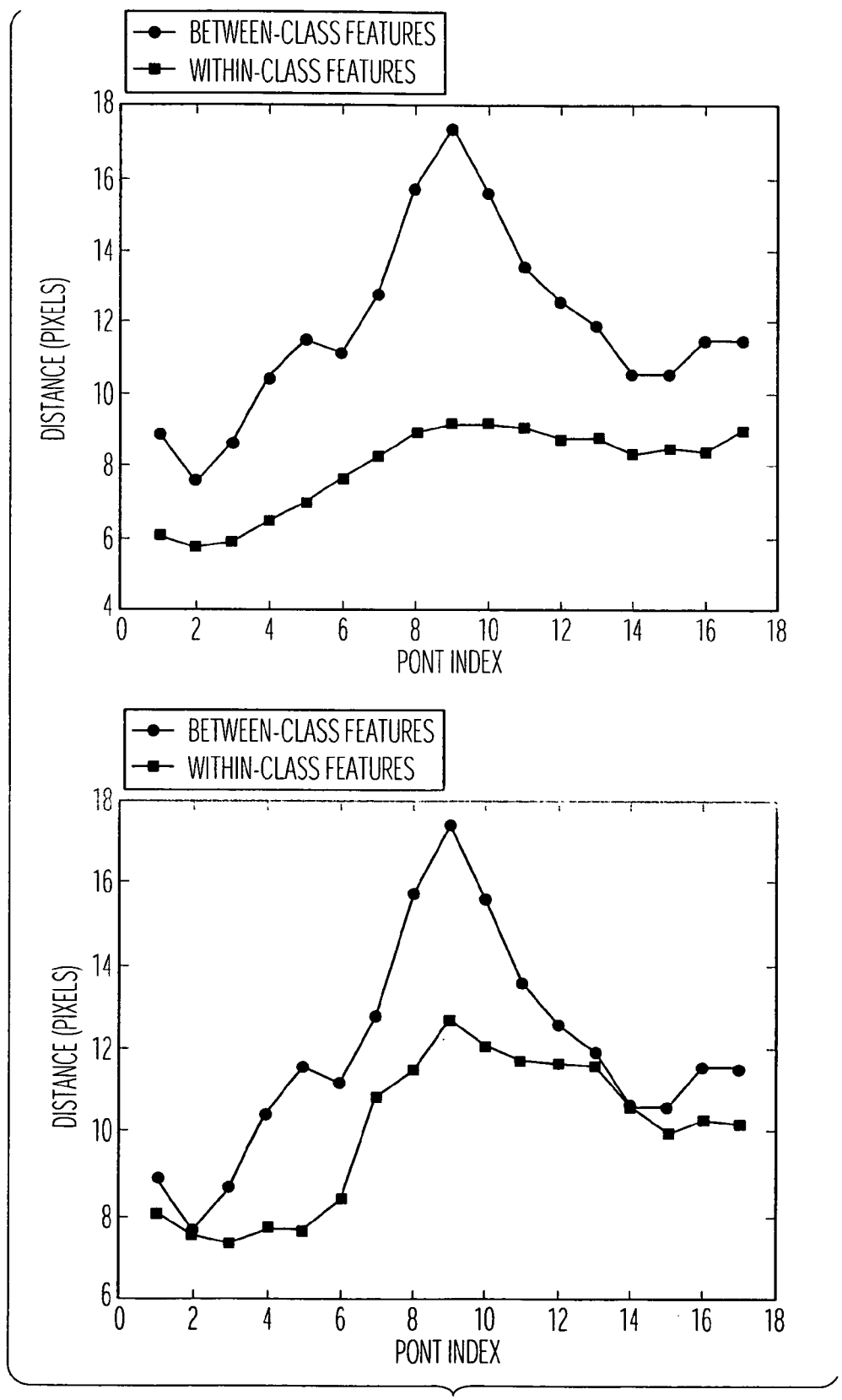
FIG. 10a illustrates the median error for each control point for the A4C set and the A2C set relative to an expert shape by using between-class features and within-class features.
Figure 10B:
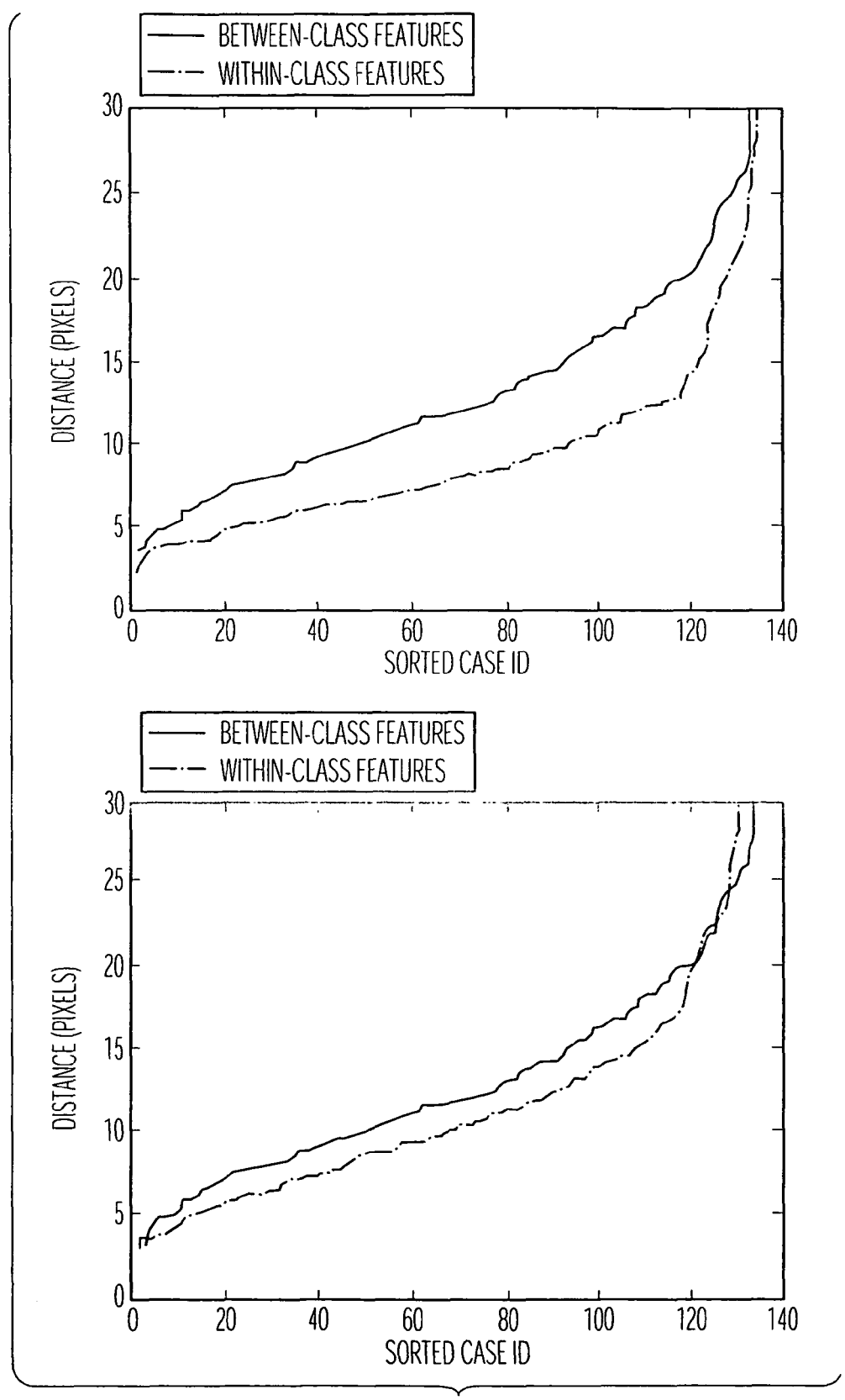
FIG. 10b illustrates the median error for each case for the A4C set and the A2C set relative to an expert shape by using between-class features and within-class features.

In a second experiment, the error of the entire segmentation procedure is tested. After detection and shape inference, FIG. 10*a* shows the median error for each of the 17 control points computed using the features used for detection (top curve, between-class features) and the selected features (bottom curve, within-class features). FIG. 10*b* illustrates the sorted global contour error for each case for all frames, where again lower error is obtained by using the within-class features than using the between-class features.

Figure 11A:
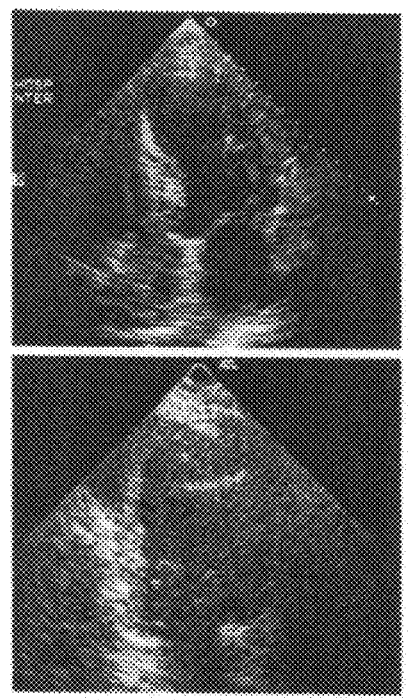
FIGS. 11a-c illustrate left ventricle endocardial border detection for the A4C set and the A2C set.
Figure 11B:
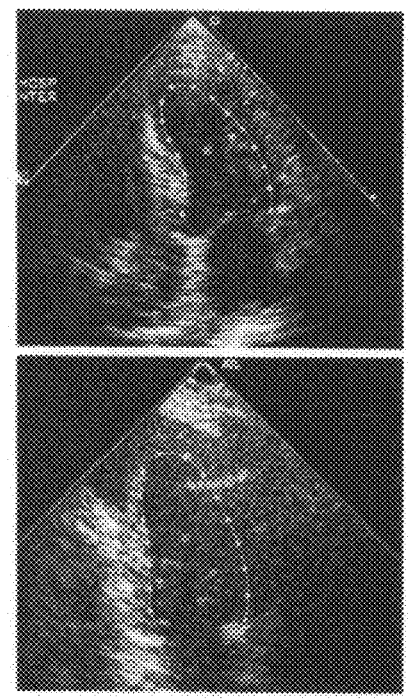
Figure 11C:
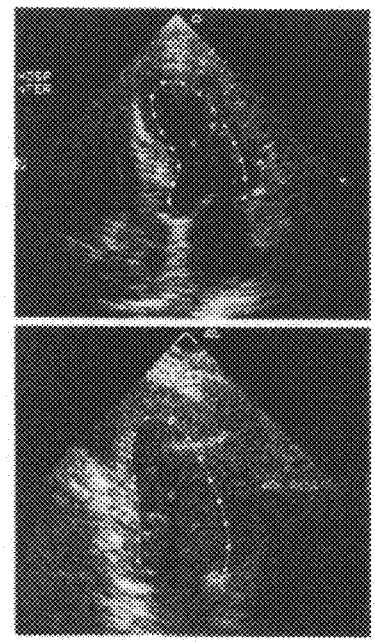

FIG. 11 compares the completely automatic segmentation result (FIG. 11b) to a contour drawn by an expert (FIG. 11c). The difficulties of the problem are illustrated in FIG. 11a where the input images are affected by speckle noise, there is not a clear border definition, there is signal dropout and imaging artifacts.

Figure 12:
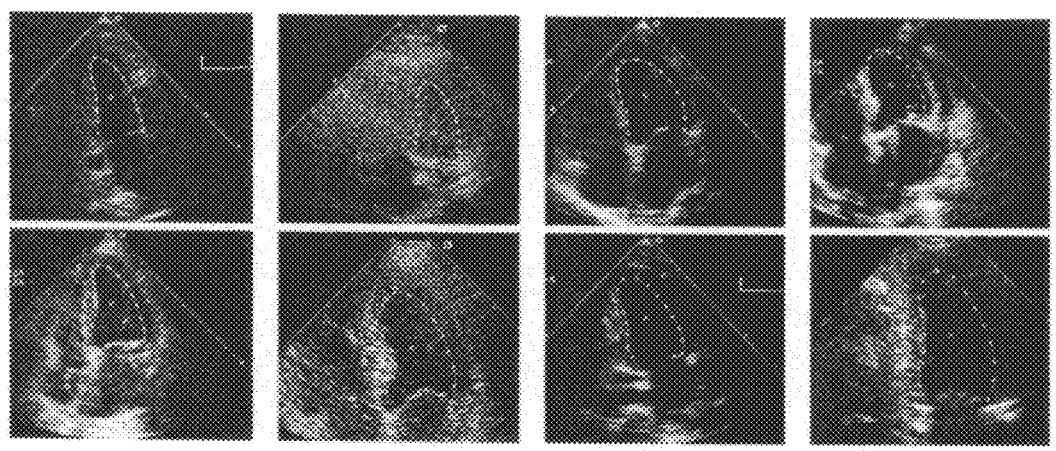
FIG. 12 illustrates additional examples of left ventricle endocardial border detection in accordance with the present invention.

Additional segmentation results are illustrated in FIG. 12 on a variety of input images. Without occlusion handling for feature computation, it is difficult to detect shapes close to the ultrasound fan (e.g., top right image). Note also the large variations in appearance of the interest structure.

Having described embodiments for a system and method for detecting structure and shape inference of an anatomical structure using database-guided segmentation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for segmenting an organ comprising the steps of:
    detecting an organ with a trained detector, wherein the step of detecting an organ comprises:
        receiving a first image that includes an organ; and
        applying a detector trained on a database of images of like organs to the first image to discriminate the organ in the first image from a background of the age; and
    determining a most likely shape of the organ, wherein the determining step comprises:
        identifying images from the database of images of like organs that are closest to the organ in the first image by using a distance between learned image features that best characterize the shape of the organ,
        wherein the database of images of like organs is used to learn the image features that best characterize the shape of the organ by emulating a distance between feature vectors to a distance between shapes;
        inferring the shape of the organ in the first image by using the identified database images to first determine the whole shape of the organ and then determine smaller parts of the shape; and
        segmenting the organ from the first image by using the inferred shape of the organ,
    wherein the method is performed using a processor, and wherein $d(c_q, c_r) = (c_q - c_r)^T (c_q - c_r)$ is the distance between shapes, $d(f_q, f_r) = (f_q - f_r)^T \Sigma (f_q - f_r)$ is the distance between feature vectors, where f is an appearance feature vector, c is its corresponding shape, $(f_q, c_q), (f_r, c_r)$ represent the vector of a query and a reference, respectively, and $\Sigma$ is a linear metric associated with the feature vector space.

2. The method of claim 1 wherein the images of like organs are expert annotated organs, and
    wherein the step of applying a detector comprises the steps of:
        using the database to train the detector to discriminate between the organ in the first image and the background of the first image; and
        using the detector to determine a location of the organ within the first image.

3. The method of claim 1 wherein the step of identifying images from the database of images of like organs comprises the steps of:
    maintaining sample based representations for the database of images;
    clustering the representations based on the distance between shapes;
    obtaining feature scores for the organ in the first image, the feature scores being indicative of the appearance of the organ in the first image; and
    selecting the features that best separate the clusters.

4. The method of claim 3 wherein features are selected that minimize the distance between the inferred shape and the actual shape of the organ in the first image.

5. The method of claim 3 wherein the features include non-image features including demographic, clinical, or genetic/genomic/proteomic information.

6. The method of claim 1 wherein the step of using the identified features to infer the shape of the organ in the first image comprises the steps of:
    applying a nearest neighbor approach to identify a closest match between a set of feature scores and a set of sample representations of features and shapes of organs;
    using a distance measurement to quantify similarities between the feature score set and the sample representations set; and
    selecting the representative samples that are most similar to the organ in the first mage based on the distance measurement.

7. The method of claim 6 wherein a small distance measurement between features is indicative of a sample shape that matches the shape of the organ in the first image.

8. The method of claim 1 wherein the organ in the first image comprises a left ventricle.

9. The method of claim 1 wherein the first image is a two dimensional image.

10. The method of claim 1 wherein the first image is a three dimensional image.

11. The method of claim 1 wherein the images in the databases are annotated by demographic, clinical, or genetic/genomic/proteomic information.

12. The method of claim 1 wherein the closeness between images are measures with consideration of non-image features including demographic, clinical, or genetic/genomic/proteomic information.

13. The method of claim 1, wherein the detector is trained by:
    using a weighted alignment scheme to increase influence of stable landmark points associated with the organ in the first image;
    eliminating influences of known invalid regions in the first image by using an occlusion mask; and
    using a boosted cascade of simple classifiers to train the detector on valid regions of the first image.

14. The method of claim 13 wherein the invalid regions are occlusions.

15. The method of claim 13 wherein the step of eliminating influences further comprises the steps of:
    setting an intensity value for each pixel in an invalid region to zero; and
    determining a number of valid pixels by computing an integral mask of the first image.

16. The method of claim 13 wherein the step of using a weighted alignment scheme comprises the steps of:
    assigning higher weights to more stable points in the first image; and using a least-square alignment scheme to normalize the shape of the first image of the organ.

17. A method for segmenting an organ comprising the steps of:
   detecting an organ with a trained detector, wherein the step of detecting an organ comprises:
   receiving a first image that includes an organ; and
   applying a detector trained on a database of images of like organs to the first image to discriminate the organ in the first image from a background of the first image; and
   determining a most likely shape of the organ, wherein the detector is trained by:
   using a weighted alignment scheme to increase influence of stable landmark points associated with the organ in the first image;
   eliminating influences of known invalid regions in the first image by using an occlusion mask; and
   using a boosted cascade of simple classifiers to train the detector on valid regions of the first image,
   wherein with a weight matrix W, a minimized criterion for aligning shapes is given by $\tilde{\mathfrak{S}}_{GPA}=\|s_i R_i c_i + t_i - \bar{c}\|_W$, where $c_i$ represents the $i^{th}$ shape control point, $s_i, R_i, t_i$ represent scale, rotation and translation, respectively, and $\bar{c}$ is the mean shape, and
   wherein the method is performed using a processor.

18. A method for segmenting an organ comprising the steps of:
   detecting an organ with a trained detector, wherein the step of detecting an organ comprises:
   receiving a first image that includes an organ; and
   applying a detector trained on a database of images of like organs to the first image to discriminate the organ in the first image from a background of the first image; and
   determining a most likely shape of the organ, wherein the detector is trained by:
   using a weighted alignment scheme to increase influence of stable landmark points associated with the organ in the first image;
   eliminating influences of known invalid regions in the first image by using an occlusion mask; and
   using a boosted cascade of simple classifiers to train the detector on valid regions of the first image,
   wherein eliminating influences of known invalid regions in the first image by using an occlusion mask comprises:
   determining, an intensity value I for each pixel (x, y) in the first image and, for each pixel at a location $(x_0, y_0)$ in the first image, computing its intensity value as follows:

$$II(x_0, y_0) = \sum_{x \leq x_0, y \leq y_0} I(x, y),$$

wherein the occlusion mask M is comprised of Boolean values where valid pixels are assigned a value of 1 and invalid or occluded pixels are assigned a value of 0;
   computing an integral mask as follows:

$$IIM(x_0, y_0) = \sum_{x \leq x_0, y \leq y_0} M(x, y);$$

and
   computing a feature value f of part of the first image that has an occlusion as follows:

$$f = \frac{n_-}{N} \sum_{(x,y) \in R_+} I(x, y) - \frac{n_+}{N} \sum_{(x,y) \in R_-} I(x, y),$$

where $n_-$, $n_+$ denote a number of valid pixels for negative and positive regions, respectively, each containing N pixels, and
   wherein the method is performed using a processor.

* * * * *